United States Patent
Côté et al.

(10) Patent No.: US 11,502,930 B2
(45) Date of Patent: *Nov. 15, 2022

(54) METHOD AND SYSTEM FOR GENERATING ALERTS USING PARAMETER BASED NETWORK MONITORING FOR ALERT CONDITIONS

(71) Applicant: Elasticsearch B.V., Mountain View, CA (US)

(72) Inventors: Michel Philippe Côté, Ottawa (CA); Courtney Ewing, Lititz, PA (US)

(73) Assignee: Elasticsearch B.V., Mountainview, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,461

(22) Filed: Feb. 24, 2021

(65) Prior Publication Data

US 2021/0184959 A1  Jun. 17, 2021

Related U.S. Application Data

(63) Continuation of application No. 16/670,791, filed on Oct. 31, 2019, now Pat. No. 10,986,012.

(51) Int. Cl.
| | | |
|---|---|---|
| *G06F 11/34* | (2006.01) | |
| *H04L 43/16* | (2022.01) | |
| *H04L 43/0817* | (2022.01) | |
| *H04L 41/22* | (2022.01) | |
| *H04L 67/10* | (2022.01) | |
| *G06F 11/07* | (2006.01) | |

(52) U.S. Cl.
CPC .......... *H04L 43/16* (2013.01); *G06F 11/0709* (2013.01); *G06F 11/3409* (2013.01); *G06F 11/3495* (2013.01); *H04L 41/22* (2013.01); *H04L 43/0817* (2013.01); *H04L 67/10* (2013.01)

(58) Field of Classification Search
CPC ..... H04L 67/10; H04L 43/16; H04L 43/0817; H04L 41/22; H04L 41/16; H04L 41/0681; H04L 41/0627; H04L 41/0213; H04L 63/1416; H04L 67/22; G06F 2201/81; G06F 11/3495; G06F 11/3476; G06F 11/3409; G06F 11/327; G06F 11/3006; G06F 11/0793; G06F 11/0769; G06F 11/0709; G06F 11/0781; G06F 16/22; G01D 4/002
See application file for complete search history.

(56) References Cited

U.S. PATENT DOCUMENTS

| | | | |
|---|---|---|---|
| 10,986,012 B1 | 4/2021 | Côté et al. | |
| 2004/0054770 A1* | 3/2004 | Touboul | .............. H04L 41/0213 709/223 |

(Continued)

*Primary Examiner* — Le H Luu
(74) *Attorney, Agent, or Firm* — Quinn IP Law

(57) ABSTRACT

Provided are systems and methods for generating alerts in a computing environment. An example method may commence with receiving parameters associated with an alert. The parameters may include at least an alert condition and an action to be performed based on the alert condition. The method may further include monitoring at least a portion of a network data according to a predetermined schedule based on the parameters. The method may further include generating the alert upon detection of the alert condition.

23 Claims, 12 Drawing Sheets

(56) References Cited

U.S. PATENT DOCUMENTS

| | | | |
|---|---|---|---|
| 2007/0050777 A1* | 3/2007 | Hutchinson | G06F 11/0781 718/104 |
| 2009/0313562 A1* | 12/2009 | Appleyard | G01D 4/002 715/764 |
| 2013/0305102 A1* | 11/2013 | Malnati | G06F 11/0709 714/49 |
| 2018/0041595 A1* | 2/2018 | Dintenfass | H04L 67/22 |
| 2018/0091528 A1* | 3/2018 | Shahbaz | H04L 63/1475 |
| 2019/0095478 A1* | 3/2019 | Tankersley | G06F 16/2379 |
| 2019/0163678 A1* | 5/2019 | Bath | G06F 16/22 |
| 2021/0135970 A1 | 5/2021 | Côté et al. | |

\* cited by examiner

METHOD AND SYSTEM FOR GENERATING ALERTS USING PARAMETER BASED NETWORK MONITORING FOR ALERT CONDITIONS

CROSS-REFERENCE TO RELATED APPLICATIONS

This application is a Continuation of, and claims the priority benefit of, U.S. patent application Ser. No. 16/670,791 filed on Oct. 31, 2019, entitled "ALERTING SYSTEM IN COMPUTING ENVIRONMENTS," the disclosure of which is incorporated herein by reference in its entirety for all purposes.

FIELD OF THE PRESENT TECHNOLOGY

The present technology relates generally to alerting in computing environments, and more particularly, but not by limitation, to systems and methods for creating customized alerts and monitoring computing environments to detect alert conditions.

BACKGROUND

Constant monitoring of a network performance and receiving alerts when unusual network patterns are detected in a computing environment is one way to timely and adequately respond to changes in a data network. However, when modifying built-in default alerts or creating custom alerts, the user may face various difficulties or inconveniences, such as the need to write alerts in a predetermined format, e.g., in JavaScript Object Notation (JSON) format, and store the alerts in a JSON file. Furthermore, the user may have a limited list of programming languages at their disposal for creating alerts; for example, they may be restricted to using only the domain-specific language (DSL). In some conventional systems, the number of concurrently running network monitoring processes may be limited by the system and, therefore, inadequate to support the need for constantly growing data networks.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a method for generating alerts in a computing environment is provided. The method may commence with receiving parameters associated with an alert. The parameters may include at least an alert condition and an action to be performed based on the alert condition. The method may further include monitoring at least a portion of network data according to a predetermined schedule based on the parameters. The method may further include generating the alert upon detection of the alert condition.

According to one example embodiment of the disclosure, a system for generating alerts in a computing environment is provided. The system may include a processor and a memory communicatively coupled to the processor. The memory may store instructions executable by the processor. The processor may be configured to receive parameters associated with an alert. The parameters may include at least an alert condition and an action to be performed based on the alert condition. The processor may be further configured to monitor at least a portion of network data according to a predetermined schedule based on the parameters. The processor may be further configured to generate the alert upon detecting the alert condition.

According to yet another aspect of the disclosure, there is provided a non-transitory processor-readable medium, which stores processor-readable instructions. When the processor-readable instructions are executed by a processor, they cause the processor to implement the above-mentioned method for generating alerts.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of systems and methods for generating alerts in a computing environment. The systems and methods include making a computing environment more observable to enable detecting more complex conditions and taking more sophisticated actions. In conventional systems, alerting is focused on detecting a condition and notifying a user about the detected condition. The systems and methods of the present disclosure leverage a part of a control or feedback loop by monitoring a data network, detecting a condition, taking an action, and continuing monitoring of the data network.

The methods disclosed herein enable a user to provide parameters associated with an alert. In particular, the user may define an alert condition and an action to be performed based on the alert condition. In an example embodiment, the alert condition includes a performance threshold, a central processing unit usage, a network anomaly, a bandwidth usage, a memory usage, a predetermined network pattern, and so forth. The user may specify, in the parameters, an object to be monitored, e.g., a portion of a network data. As used herein, the term "network data" includes data associated with processes, file systems, computer data, and any other types of data in any form. Based on the parameters provided by the user, the portion of the network data may be monitored according to a predetermined schedule. Upon detecting the alert condition in the portion of the network data, an alert may be generated. The alert may be presented to the user, e.g., via an email, and/or logged into a database and used in a subsequent analysis of the computing environment.

Figure 1:
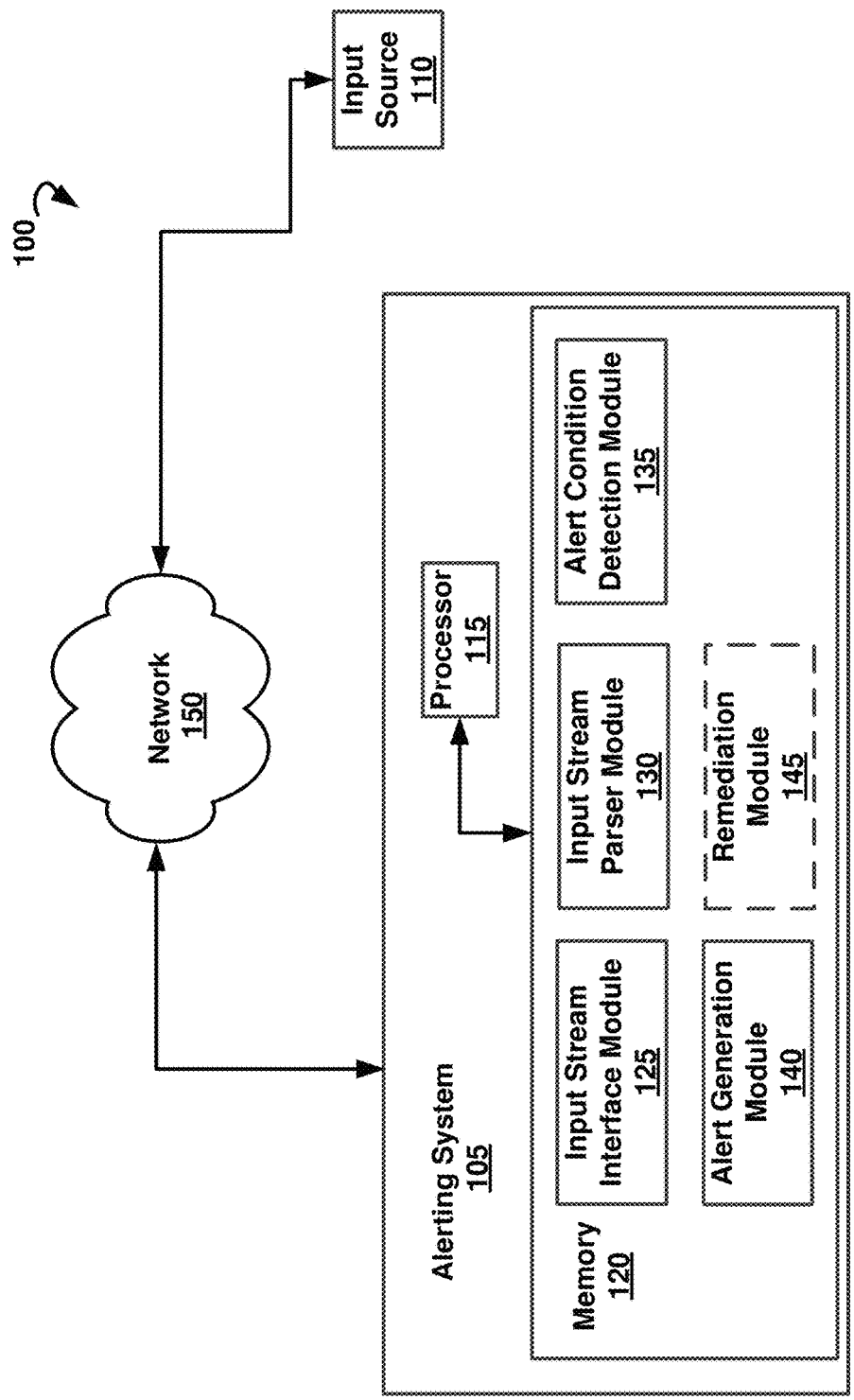
FIG. 1 is a high level schematic diagram of a computing architecture for practicing aspects of the present technology, according to example embodiments.

Referring now to the drawings, FIG. 1 is a high level schematic diagram of an exemplary computing architecture (hereinafter referred to as architecture 100) of a computing environment of the present technology. The architecture 100 includes an exemplary system for generating alerts in a computing environment shown as an alerting system 105. In some embodiments, the alerting system 105 includes a server or cloud-based computing device configured specifically to perform the analyses described herein. That is, the alerting system 105 in some embodiments is a particular purpose computing device that is specifically designed and programmed (e.g., configured or adapted) to perform any of the methods described herein. The alerting system 105 can also include a plurality of distributed computing systems that cooperatively provide the features of the alerting system 105. For example, individual ones of the plurality of distributed computing systems can provide one or more unique functions or services. In some embodiments, the alerting system 105 can comprise a cloud computing environment or other similar networked computing system.

The alerting system 105 can be coupled with an input source 110 that provides an input stream to the alerting system 105. An input source 110 can include, for example, a computing system, an enterprise network, a plurality of computing systems arranged as a network, virtual machines, application(s), network tap(s), services, a cloud, containers, or other similar computing environment that creates data instances. In some embodiments, the input source 110 includes a database or data store that stores pre-obtained data from any of the aforementioned sources for use in accordance with the present disclosure.

In one embodiment, the alerting system 105 includes a processor 115 and memory 120 for storing instructions. The memory 120 can include an input stream interface module 125, an input stream parser module 130, an alert condition detection module 135, an alert generation module 140, and a remediation module 145. As used herein, the terms "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

In some embodiments, the alerting system 105 receives an input stream from the input source 110 via the input stream interface module 125. For example, an input stream can be received from a computing environment. An input stream may include data in the form of a plurality of data instances that are collected over a period of time.

When the input stream is received, the input stream parser module 130 may be executed to separate or parse the input stream into data instances that are ordered in time. That is, in various embodiments, the data instances are collected over the period of time.

The alert condition detection module 135 may analyze the data of the input stream to determine whether any of the alert conditions are satisfied. In an example embodiment, the alert conditions may be preliminarily defined by a user. In an example embodiment, the alert condition detection module 135 may use unsupervised machine learning to analyze the data of the input stream to detect alert conditions. In general, alert conditions can include any deviation in the data as viewed over time. For example, if the data are collected for a network such as a cloud, changes in resource utilization of a service within the cloud can be identified as an alert condition. In another example, a brief spike in file transfer rates between a computing device and another computing device (possibly in a foreign country) can be flagged as an alert condition. The present disclosure is not intended to be limited to unsupervised machine learning and in some embodiments can incorporate other machine learning methods.

Upon detecting the alert condition by the alert condition detection module 135, the alert generation module 140 may generate an alert. The generation of the alert may include creating a log entry in a database, providing a notification to the user, sending an email to the user, sending the alert to the user via a messenger, calling a webhook, performing indexing, generating a report, scheduling a predetermined action, and so forth.

In various embodiments, the alerting system 105 separately and precisely controls the rate at which the alerting system 105 generates alerts at a specific severity, i.e., the alerting system 105 does not allow this to exceed (over a very long time frame, although it can exceed it for shorter time frames) more than a certain value. Higher severity alerts are allowed less frequently, according to some embodiments. Some aspects of alerting are described in U.S. patent application Ser. No. 15/498,406, the disclosure of which is included by reference in its entirety.

In some example embodiments, the remediation module 145 may be executed to remediate an anomaly or unwanted changes detected in the computing environment. The remediation module 145 may be initiated by the user or may be launched automatically based on generation of the alert. For example, the remediation module 145 may automatically add a malicious Internet Protocol (IP) address (e.g., an IP address that sends multiple identical packets) to a blacklist.

The alerting system 105 may be a semi-autonomous system governed by a two way conversation (e.g., chatbots) or a fully autonomous system, thereby providing auto-scaling, self-healing, and self-optimizing in the computing environment.

In sum, the present disclosure provides various embodiments of systems and methods to detect satisfying of the alert conditions within computing environments and generate alerts. The systems and methods can detect unusual events, rates, metrics, and so forth for any computing environment. In some embodiments, the simultaneous monitoring of multiple alert conditions can be performed by the systems and methods described herein. For example, the systems and methods can detect both exfiltration of data and excessive login attempts.

The user may scale the alert generation to the extent the user needs for his specific purposes. As the concurrent monitoring of multiple alert conditions may include running a plurality of light-weight (i.e., low memory and resource consuming) processes, the performance of the system for generating alerts in a computing environment as described herein may be increased as compared to conventional network monitoring systems. In some embodiments, an optimistic concurrency control may be applied in the system for generating alerts to run simultaneous multiple monitoring and alert generation processes without these multiple processes interfering with each other. The optimistic concurrency control is a concurrency control method that assumes that multiple processes can frequently complete without interfering with each other.

For example, when detecting whether alert conditions are satisfied, the alerting system 105 may check whether detection was already made in another alert process. If there is a conflict, the alerting system 105 may automatically reconcile the conflict by discarding its findings, i.e., discarding an output associated with the alert, thereby preventing duplicate alert generation. Furthermore, the optimistic concurrency control may enable creating a multi-task monitoring process that concurrently monitors a plurality of alert conditions instead of creating multiple monitoring processes, each of which monitors one alert condition. Therefore, the applying of the optimistic concurrency control and avoidance of conflicting alerts may improve the performance of the alerting system 105 and may allow the alerting system 105 to monitor the presence of multiple alert conditions in a data network and promptly react to them by generating the alerts.

It should be noted that the term "alerting" as used herein means not merely generating or sending alerts, but rather includes running network monitoring processes and generating alerts upon detection of alert conditions based on the monitoring.

Having provided the above details of certain concepts of the systems and methods described above, the description now turns to further detailing aspects of the present technology according to various embodiments.

Although various example embodiments are described herein with respect to KIBANA solution and other elements of an integration solution called ELASTIC STACK, the present technology is not so limited. KIBANA provides for data visualization and exploration, for example, for log and time-series data analytics, application monitoring, and other use cases regarding user's data on its servers, cloud-based services used, and so forth.

Figure 2:
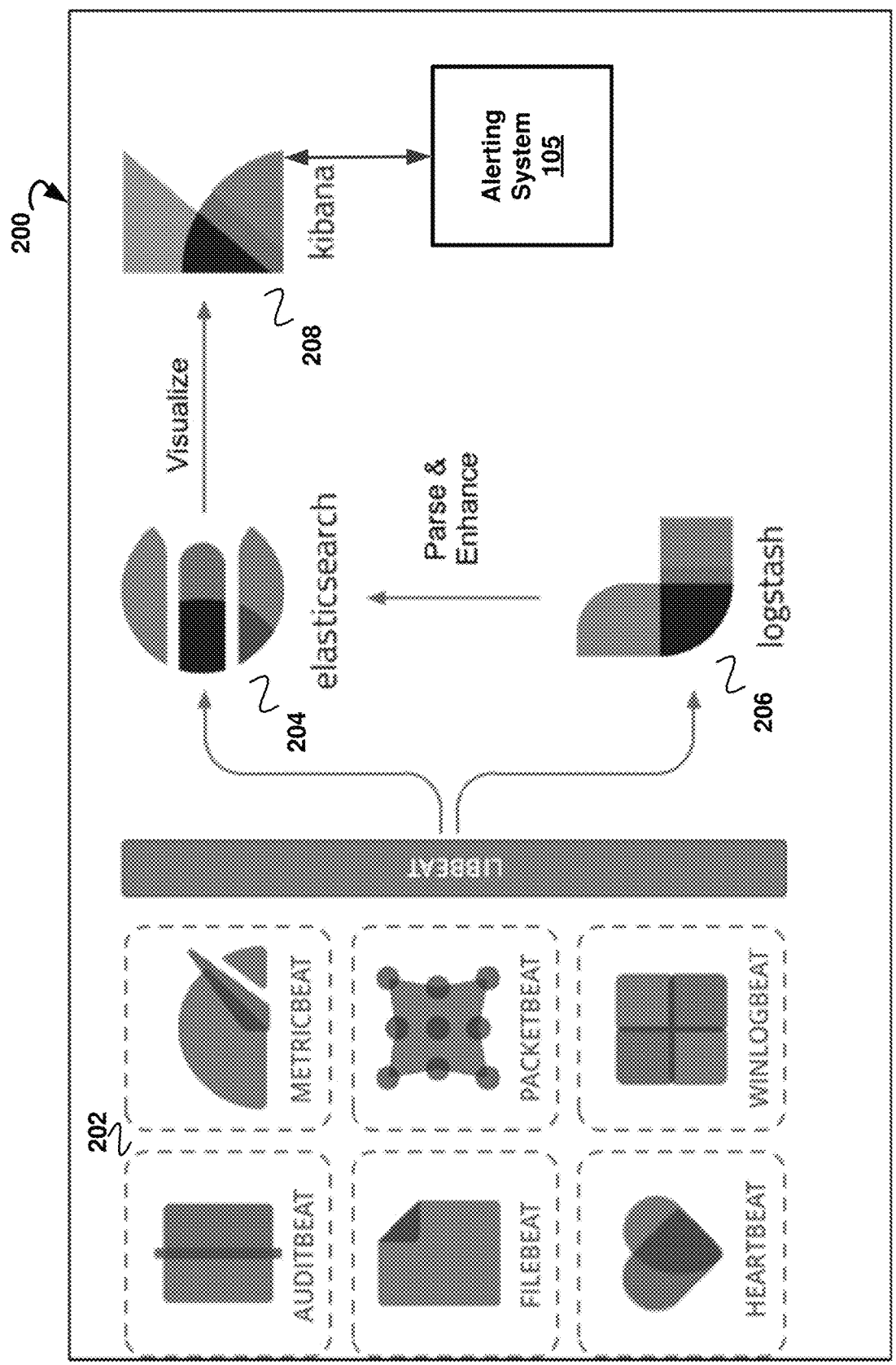
FIG. 2 is an example overall diagram illustrating various aspects and process flow of systems and methods of the present disclosure, according to example embodiments.

FIG. 2 is an example diagram of a system 200 illustrating KIBANA connections and flow with respect to other aspects of an integrated solution referred to as ELASTIC STACK. BEATS 202 can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). Although each of those is shown in FIG. 2, BEATS need not include all of those elements in this example. BEATS can send data directly into ELASTICSEARCH 204 or via LOGSTASH 206 (a data-collection and log-parsing engine) where it can be further processed and enhanced before visualizing, analyzing, and exploring it using KIBANA 208. Although FIG. 2 includes KIBANA 208 and other particular aspects and components, the present technology is not limited to utilizing some or all of the components and aspects.

The alerting system 105 of the present disclosure may be a part of KIBANA 208. KIBANA 208 can provide a powerful and easy-to-use visual interface with features such as histograms, line graphs, pie charts, and sunbursts and can enable a user to design their own visualization (e.g., leveraging the full aggregation capabilities of the ELASTICSEARCH 204 (a distributed, multitenant-capable full-text analytics and search engine)). In that regard, KIBANA 208 can provide tight integration with ELASTICSEARCH 204 for visualizing data stored in ELASTICSEARCH 204. KIBANA 208 may also leverage the Elastic Maps Service to visualize geospatial data or visualize custom location data on a schematic of the user's choosing. Regarding time series data, KIBANA 208 can also perform advanced time series analysis on a company or other user's ELASTICSEARCH 204 data with provided curated time series user interfaces (UIs). Queries, transformations, and visualizations can be described with powerful, easy-to-learn expressions. Relationships can be analyzed with graph exploration.

With KIBANA 208, a user may take the relevant capabilities of a search engine, combine them with graph exploration, and uncover the relationships in the user's ELASTICSEARCH 204 data. In addition, KIBANA 208 can enable a user to detect the alert conditions hiding in a user's ELASTICSEARCH 204 data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA 208.

It can be provided for the user to share visualizations and dashboards (e.g., KIBANA 208 or other visualizations and dashboards) within a space or spaces (e.g., using KIBANA SPACES), with others, e.g., a user's team members, the user's boss, their boss, a user's customers, compliance managers, and/or contractors, while controlling access.

Figure 3:
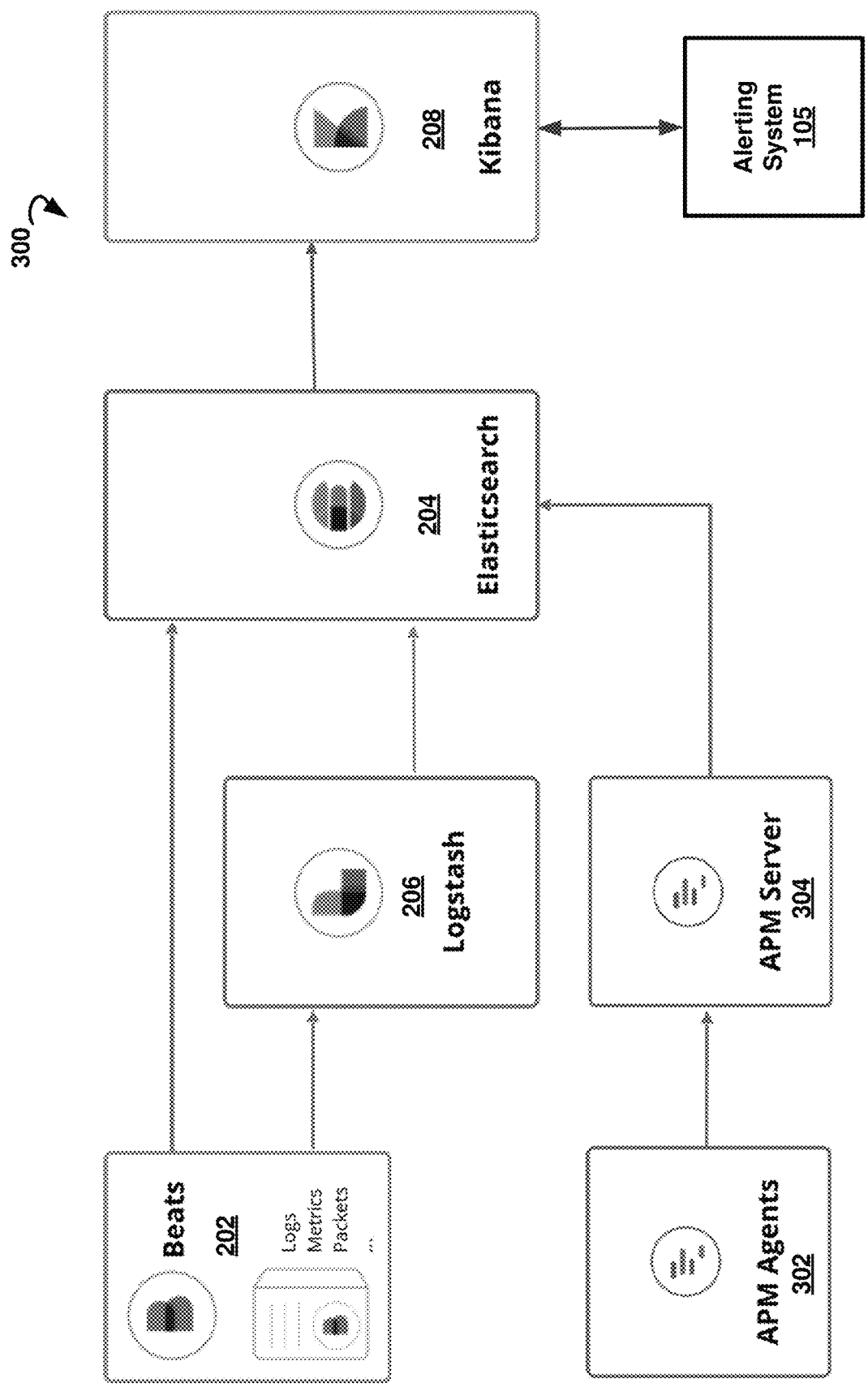
FIG. 3 is an example overall diagram showing various application performance monitoring aspects within the environment in the example in FIG. 2, according to some embodiments.

FIG. 3 is an example overall diagram 300 showing various application performance monitoring (APM) aspects within the environment in the example in FIG. 2, according to some embodiments. In the example in FIG. 3, a plurality of APM agents 302 are included. In various embodiments, the APM agents are open-source libraries written in the same language as a user's service. A user may install APM agents 302 into their service as the user would install any other library. The APM agents 302 can instrument a user's code and collect performance data and errors at runtime. In various embodiments, the collected performance data and errors (also referred to collectively as collected data or just data) is buffered for a short period and sent on to APM Server 304. In some embodiments, the APM Server 304 is an open source application which typically runs on dedicated servers. The APM Server 304 may receive the collected data from the APM agents 302 through an application programming interface (API). In some embodiments, the APM Server 304 creates documents from the collected data from the APM agents 302 and stores the documents in the full-text search and analytics engine, e.g., ELASTICSEARCH 204 in this example. ELASTICSEARCH 204 can allow the user to store, search, and analyze big volumes of data quickly and in near real time. The documents can include APM performance metrics. As further described herein, KIBANA 208 is an open source analytics and visualization platform designed to work with ELASTICSEARCH 204. KIBANA 208 may be used to search, view, and interact with data stored in ELASTICSEARCH 204. KIBANA 208 may also be used to visualize APM data by utilizing the APM UI.

In various embodiments, the APM agents 302 capture different types of information from within their instrumented applications, known as events. The events may be network patterns, errors, spans, or transactions. These events may be then streamed to the APM Server 304, which validates and processes the events.

Historically, software applications have been monolithic in that the code was contained within a single application. Modern architectures often include multiple services and multiple applications that talk to each other. This is also referred to as a microservice architecture. Microservices are also referred to herein shortened to services for conciseness. Applications and services may also be referred to herein as just services for conciseness.

As part of serving a web request on a particular website, there might be, for example, several services invoked. There could be two or dozens of services invoked for one request. A web request is also referred to herein as a request or an Hyper Text Transfer Protocol (HTTP) request. Part of serving a particular request could involve queries made to back-end services such as to www.google.com, and while waiting for response in a browser, the GOOGLE back-end is getting requests through several services, which could also delay getting a response to the particular request. In various embodiments, distributed tracing allows a user (such as a developer and the like) to follow a request as it comes in and how it automatically propagates through the services. In various embodiments, a user can see a visualization of how long the entire request took to be served. A user may also see, on a per service level, the location of the biggest bottlenecks as part of serving that particular request. The bottlenecks can be related to time and resources used, among others. Without distributed tracing with a distributed, multitenant-capable full-text analytics and search engine environment, developers and other users would have to manually determine a first service involved, look into that first service to determine manually what other services are involved and manually call up various metrics, etc., to try to identify a bottleneck. This may be a very time consuming process and sometimes impossible to do for servicing complex requests, for instance. A complex request may invoke hundreds of services, making the aforementioned manual process impossible to perform in the timely manner.

In assessing a bottleneck in processing a request, it is key to identify which services are involved, trace each one, narrow down which service(s) are the problem, and then delve even more granularly within the service. In various embodiments, instrumentation is also provided on a service level, which provides a granular view of exactly what a particular service was spending its time on. Various embodiments essentially trace all of the time consuming tasks that a certain service is doing when performing a response to a request. Thus, within the scope of that one service, methods and systems according to various embodiments provide a very granular view of where time was spent. In addition to this granular breakdown, various embodiments can also provide the user with the duration that each service was occupying as part of the entire trace. Thus, the granular level within a service and the duration of each service are some of the aspects provided in various embodiments. For example, the method enables the user to visualize which part (e.g., service) of a trace was slowest in terms of the dynamics of the services and why that part (e.g., service) was so slow.

The distributed tracing in various embodiments is structured to function in particular environments and enables a user to analyze performance throughout their microservices architecture all in one view, with that environment. Transactions and spans can form the trace. Traces can group together events that have a common root.

Figure 4:
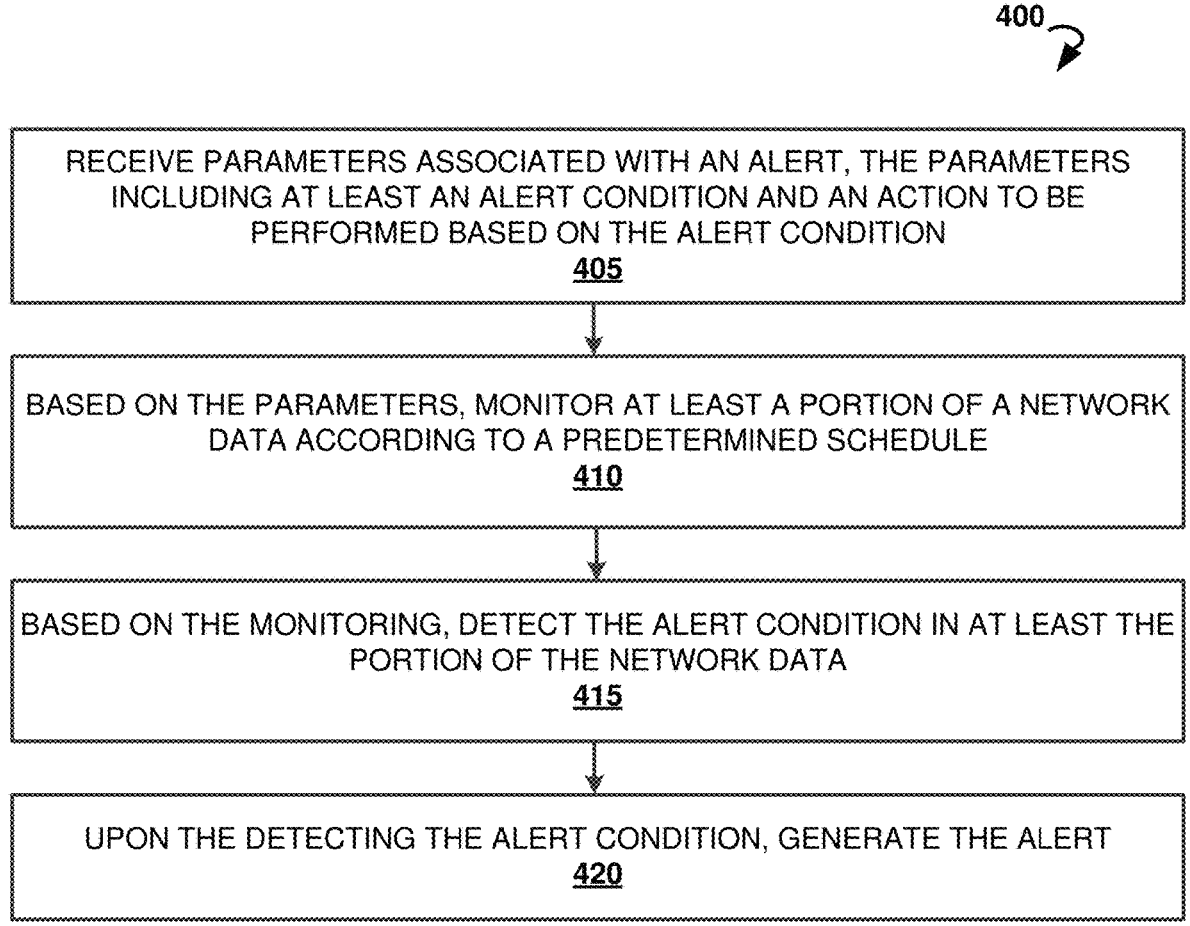
FIG. 4 is a flowchart of a method for generating alerts in a computing environment, according to an example embodiment.

FIG. 4 is a flow chart showing a method 400 for generating alerts in a computing environment, according to an example embodiment. The method 400 may commence with receiving parameters associated with an alert at step 405. The parameters may be received from a user, for example, via one or more of the following: an alert user interface, an alert API, an alert library, an alert base, and so forth. In particular embodiments, the parameters may be received from the user in the form of a plugin code from the user or an API extension plugin. In a further example embodiment, the user may provide parameters by modifying a templated alert or by generating an expression-based alert. The expressions may be provided via an expression language supported in the computing environment, with a plurality of functions and other capabilities, including table transforms, type casting, and sub-expressions.

The parameters may include at least an alert condition and an action to be performed based on the alert condition. The alert condition may include one or more of the following: a performance threshold, a central processing unit usage, a network anomaly, a bandwidth usage, a memory usage, a predetermined network pattern, a geoboundary entry, a geoboundary exit, logging data of one or more users, and the like. The parameters may further include an object to be monitored. The object may include one or more of the following: the portion of the network data, a network traffic, a network device, a network state, and so forth.

In an example embodiment, the method 400 may include applying an optimistic concurrency control procedure to an output associated with alert monitoring and detection processes. The applying of the optimistic concurrency control may include analyzing the output of alert processes to determine whether the output conflicts with an output associated with other alert processes that are already running or created in the computing environment. If a conflict is found, the output may be discarded to ensure that no conflicts between the output associated with the alert process and the output associated with each of a plurality of alert processes already created in the computing environment exist.

The method 400 may continue with monitoring at least a portion of network data according to a predetermined schedule based on the parameters at step 410. The method 400 may further include step 415 of detecting the alert condition in the at least the portion of the network data based on the monitoring.

The method 400 may continue with generating the alert at step 420 upon detection of the alert condition. In example embodiments, the generation of the alert may include one or more of the following: creating a log entry in a database, providing a notification to a user, sending an email to the user, sending the alert to the user via a messenger, calling a webhook, generating a report, scheduling a predetermined action, scheduling generation of a report, sharing a report with a selected person/party, and so forth. The method 400 may further include performing a predetermined action based in the alert to eliminate the alert condition. Upon performing the predetermined action, the monitoring of the at least the portion of the network data may be continued.

The method 400 may further include analyzing, based on the monitoring, the at least the portion of the network data by a machine learning technique. The analysis may be performed based on historic data associated with the network data, e.g., by correlating the alert and the corresponding alert condition to historic data. In an example embodiment, the analysis may involve using unsupervised machine learning. That is, the entirety of the analysis, in some embodiments, involves the at least the portion of the network data without using pre-determined or pre-configured metrics for assessing the data instances of the at least the portion of the network data.

In an example embodiment, the alerts logged in a database, i.e., an alert history, may themselves be considered a source of network data and may provide understanding of the computing environment and its state. In each use case for which the alert was generated, the data associated with the alerts may be interpreted in a specific predetermined way. The action triggered in response to the detected alert conditions may be based on data from multiple sources. Therefore, different types of alerts and events may be correlated to understand a situation in the computing environment. In some embodiments, higher level alerts may be triggered based on patterns in lower level alerts. For example, alerts associated with a first subsystem of the computing environment may show a service outage and alerts associated with a second subsystem of the computing environment may explain which transaction caused the service outage, while monitoring alerts may state in detail why this situation happened. Furthermore, the user may segment the creation and viewing of alerts across portions of the computing environment. Therefore, the alerting system may provide context, enable correlation, and improve awareness both for the user and the computing environment itself.

The method 400 may continue with visualizing a plurality of alerts for the user via an alert user interface. The plurality of alerts may be generated based on the parameters provided by the user. The visualizing may be performed by presenting one or more alert conditions that are currently monitored and presenting one or more actions done in association with one or more of the plurality of alerts.

Figure 5:
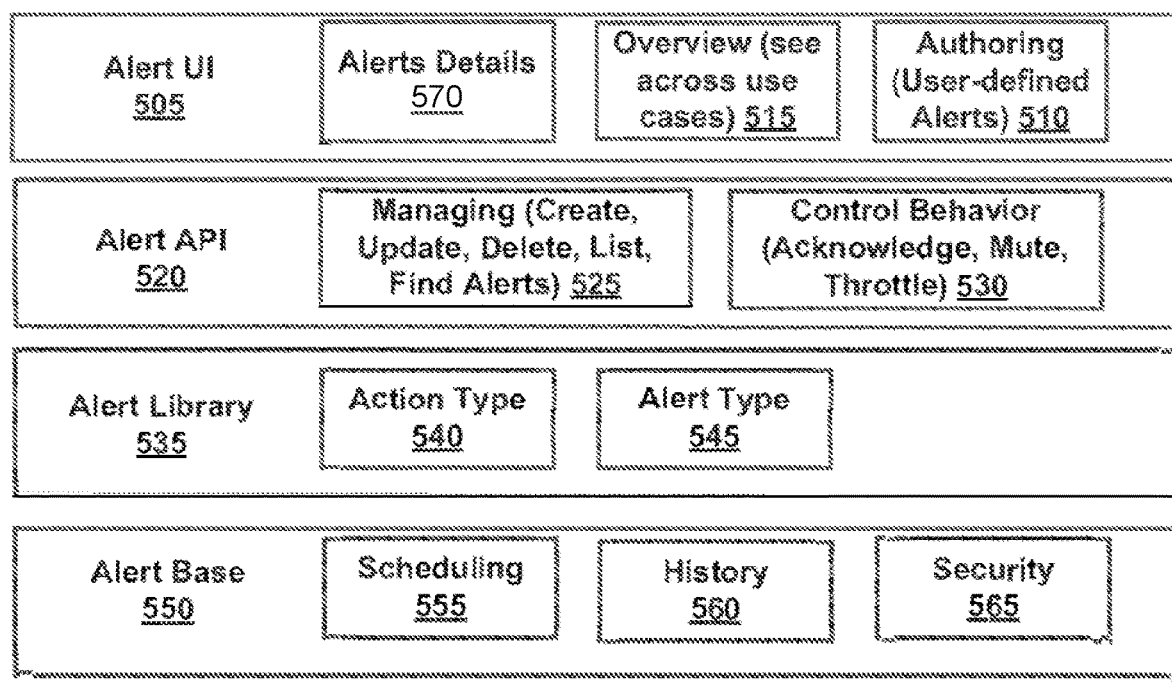
FIG. 5 is a schematic diagram showing layers of an alerting system, according to an example embodiment.

FIG. 5 shows a schematic diagram 500 showing layers of the alerting system 105 of FIG. 1. The alerting system may provide alerting integrations across all elements of the computing environment, at the plugin, API, and UI levels; provide an intuitive interface across alerting types; and ensure detection and action mechanisms via plugins.

An alert base 550 is a first layer of the alerting system. The alert base 550 may be used to set scheduling 555 (i.e., set a predetermined schedule for monitoring the network data). The scheduling 555 may include background tasks that can be distributed across several network instances for scalability and availability. The detected alert conditions and generated alerts may be stored in a block named history 560. The history 560 may be used by the machine learning techniques to analyze the network data based on the detected alert conditions and generated alerts. The security data detected based on monitoring the data network and generating the alerts may be stored in a block named security 565. In an example embodiment, scheduling 555 may include providing a scheduled report associated with alert conditions, generated alerts, and actions taken based on the alerts.

The second layer of the alerting system is an alert library 535. The user may use the alert library 535 to define an action type 540 and an alert type 545. The alert type 545 may include parameters of the alert and alert conditions. The action type 540 may specify actions needed to be performed upon detecting the alert conditions. The alert library 535 may enable the alerting system to register and initiate actions and enables the user to define his own custom actions. The actions may include logging, notifications in a messenger, email notifications, and so forth.

In an example embodiment, the alert library 535 may be configured to perform an optimistic concurrency control to ensure that multiple simultaneously running monitoring and alert generation processes do not interfere with each other. For example, upon receiving an output associated with a monitoring or detection process, the alert library 535 may check whether the output conflicts with any existing process output for the alert. If there is a conflict, the alert library 535 may discard the output to avoid any conflicts.

The third layer may include an alert API 520. The alert API 520 may be used for managing 525 the alerts (for example, creating, updating, deleting, listing, or finding alerts). The alert API 520 can enable the user to provide user-defined alerts. The user may also use the alert API 520 to control behavior 530 of alerts (for example, acknowledge, mute, throttle alerts, and so forth). The alert API 520 allows registering forms of detection as "alert types" and then running the checks on a schedule using scheduling 555. The user may provide the alert type in the form of a JavaScript function that may run in the alerting system. The JavaScript function provided by the user may power the alert. The alert API 520 and alert plugins may be designed so that a detection or action mechanism can be expressed in JavaScript running in the alerting system.

The fourth layer is an alert UI 505. The user may use the alert UI 505 to provide alert details 570, such as alert parameters. The alert UI 505 may have an authoring 510 block enabling the user to provide user-defined alerts. The alert UI 505 may further provide an overview 515 of the alerts by presenting alerts running across multiple use cases.

Figure 6:
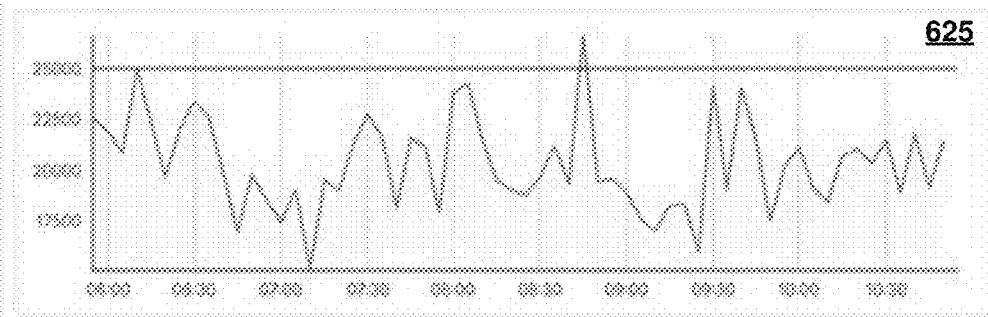
FIG. 6 is a schematic diagram showing creation of an alert by a user, according to an example embodiment

FIG. 6 is a schematic diagram 600 showing creating an alert by a user, according to an example embodiment. The user may control alerts in the computing environment by viewing, creating, and managing all alerts from an alert UI 505. The alert UI 505 may help the user stay in the know with real-time updates on which alerts are running and what actions were taken. The schematic diagram 600 shows creation of a threshold alert. First, the user may set a name 605 for the alert, e.g., "filebeat_eps." Further, the user may select indices 610 to query, e.g., a "filebeat" index. In a time field 615, the user may set a schedule for running a process of monitoring an alert condition. For example, the computing environment may be scanned for presence of the alert condition every 1 minute.

The user may further provide parameters 620 associated with the alert. For example, the user may set the alert condition associated with the threshold alert to be "when count ( ) over all documents is above 25000 for the last 60 minutes." A diagram 625 may illustrate network data captured based on the monitoring of the alert condition based on the parameters 620.

The user may also provide an action 630 to be performed if the alert condition is satisfied. For example, the action 630 selected by the user may include sending a notification to the user via a messenger 635. The user may select a recipient 640 of the notification and may enter a message 645 to be displayed in the notification. The message 645 may include metadata identifying a portion/element of the data network where the threshold was exceeded.

Another type of alert registered by the user may include an anomaly alert. For example, when the same user logged in from three different locations within an hour, the alert may be generated and a notification may be sent to the user. Therefore, the user may proactively address possible intrusion attempts.

Another example embodiment of generating alerts may include generating an alert and notifying a user when a product of the user is trending on social media. Upon being notified, the user may prepare to meet the demand and produce/deliver the appropriate quantity of the products.

Further example embodiment of generating alerts may include monitoring application logs on a website of the user and notifying the user when sensitive data, e.g., credit card numbers, become visible in the application logs.

One more example embodiment of generating alerts may include monitoring a central processing unit (CPU) usage of a plurality of servers and generating an alert with further notifying of the user when the CPU usage exceeds a predetermined threshold.

Figure 7A:
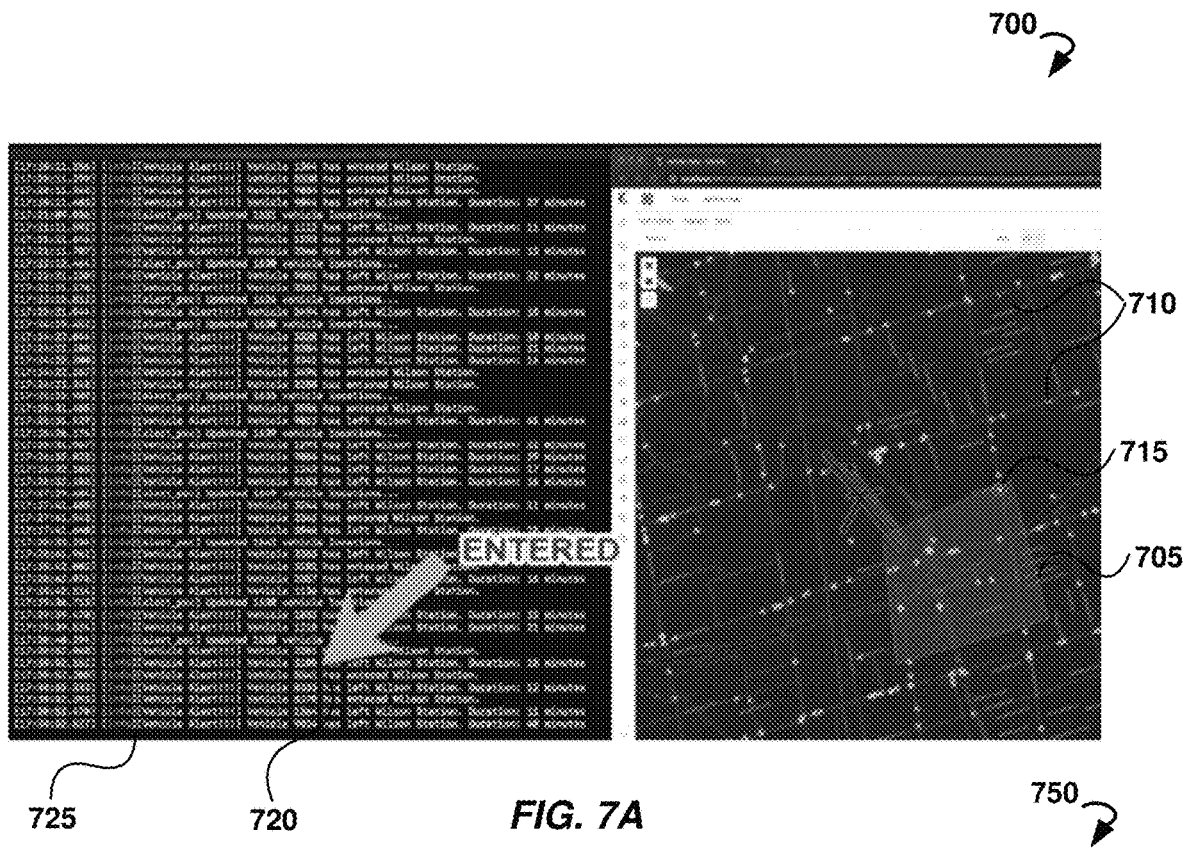
FIGS. 7A and 7B show schematic diagrams illustrating generation of alerts via an alert plugin written by a user to monitor vehicles, according to an example embodiment.
Figure 7B:
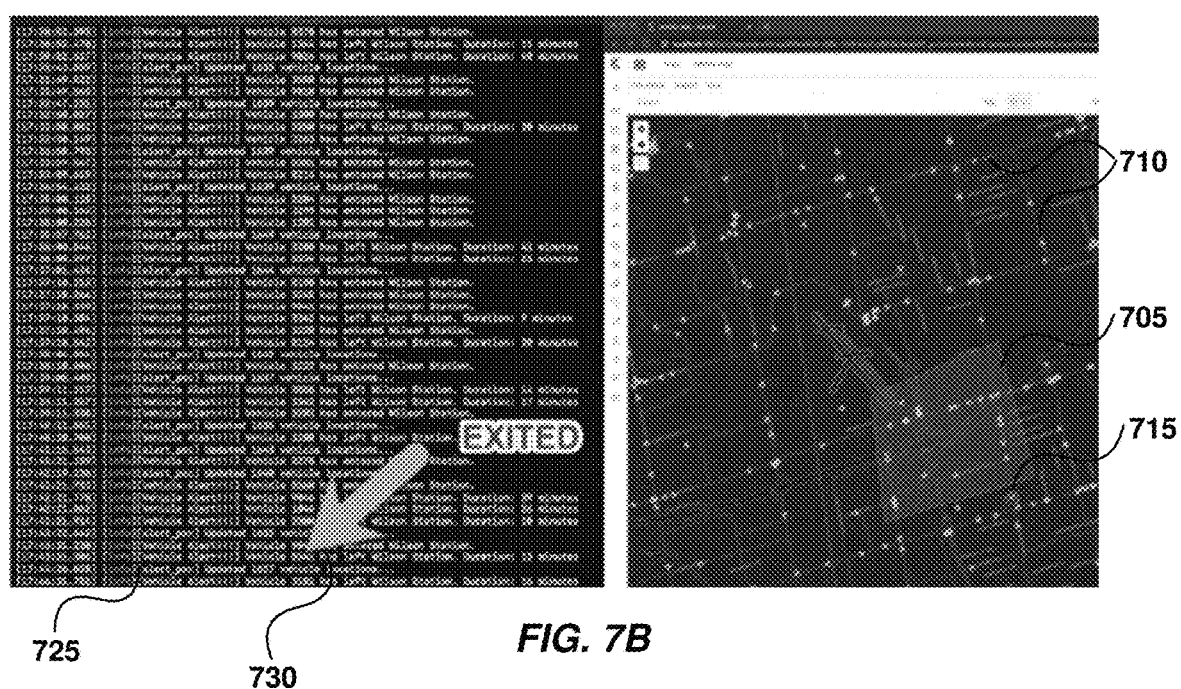

FIGS. 7A and 7B show schematic diagrams 700 and 750 illustrating generation of alerts via an alert plugin written by a user to monitor vehicles, according to an example embodiment. The user may need to monitor a plurality of vehicles and receive an alert when any of the vehicles enters and exits a particular zone. Each of the vehicles may be configured to be tracked, e.g., via a GPS device associated with the vehicle. The user may create an alert plugin, for example, by providing a code via JavaScript. The parameters associated with the alert provided by the user when creating the alert may include parameters of a geoboundary associated with the zone and data associated with each of the vehicle, such as data of the GPS device of each of the vehicles. The user may set an action to be triggered upon entering and exiting the zone by each of the vehicle. The action may include storing data relating to entrance/exit of the zone by the vehicle to an entry and storing the entry to a database.

FIG. 7A shows a geoboundary 705 and a plurality of vehicles 710. When a vehicle 715 enters the geoboundary 705, an alert 720 notifying that the vehicle 715 entered the geoboundary 705 may be created and stored to a database 725. The alert 720 may further include a timestamp storing the time when the vehicle 715 entered the geoboundary 705.

As shown in FIG. 7B, when the vehicle 715 exits the geoboundary 705, an alert 730 notifying that the vehicle 715 exited the geoboundary 705 may be created and stored to the database 725. The alert 730 may further include a timestamp storing the time when the vehicle 715 exited the geoboundary 705. All alerts created upon entering and exiting the geoboundary 705 by any of vehicles 710 and corresponding timestamps may be stored to the database 725. Therefore, the user may use a single alert plugin to automatically track the plurality of vehicles and store alerts set by the user in the database.

Figure 8:
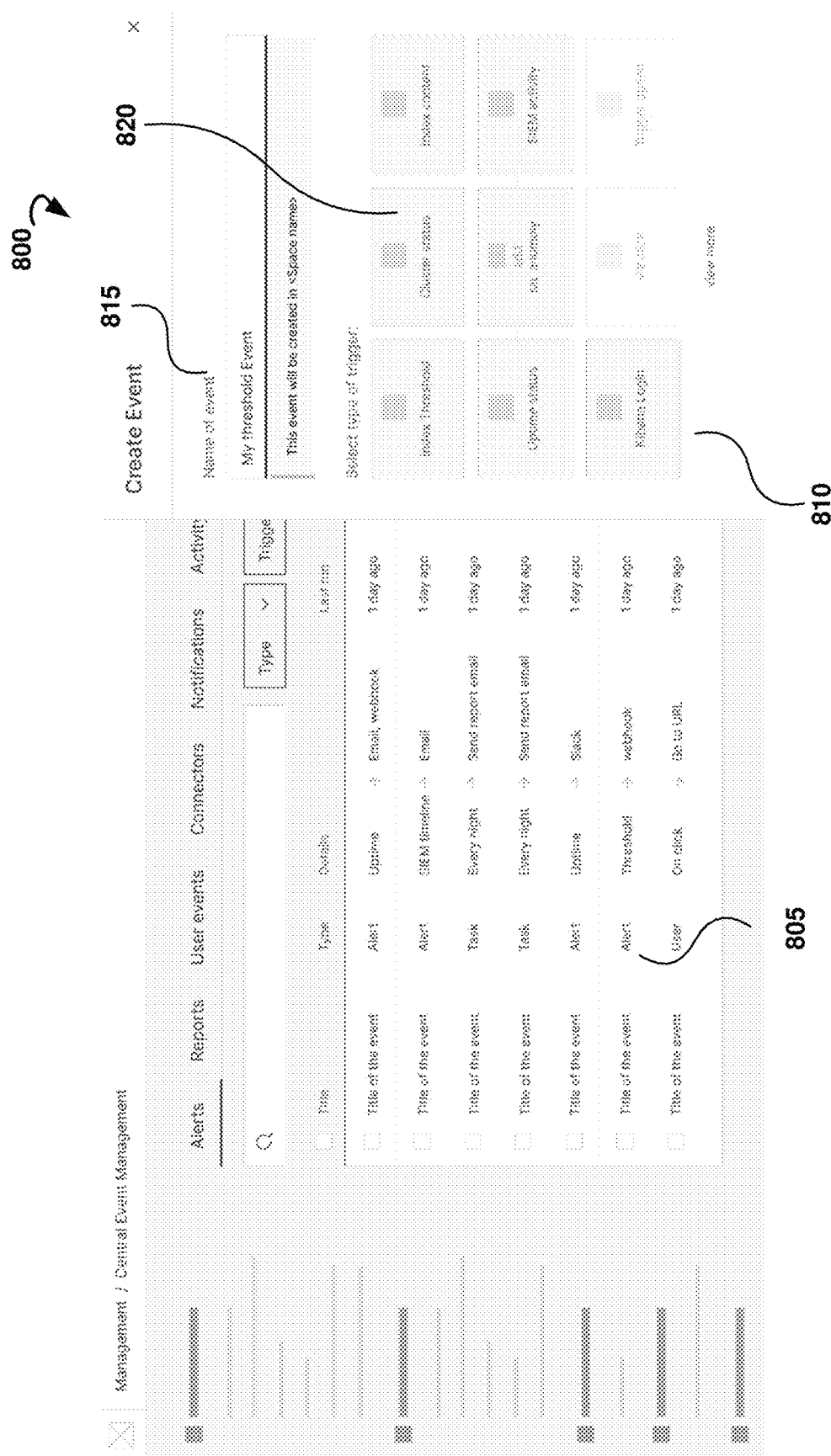
FIG. 8 shows a user interface for creating an alert, according to an example embodiment.

FIG. 8 shows a user interface 800 for creating an alert, according to an example embodiment. The user interface 800 may present a list 805 of alerts and a menu 810 for creating an alert. In the menu 810, the user may enter a name 815 of the alert and select parameters 820 of the alert.

Figure 9:
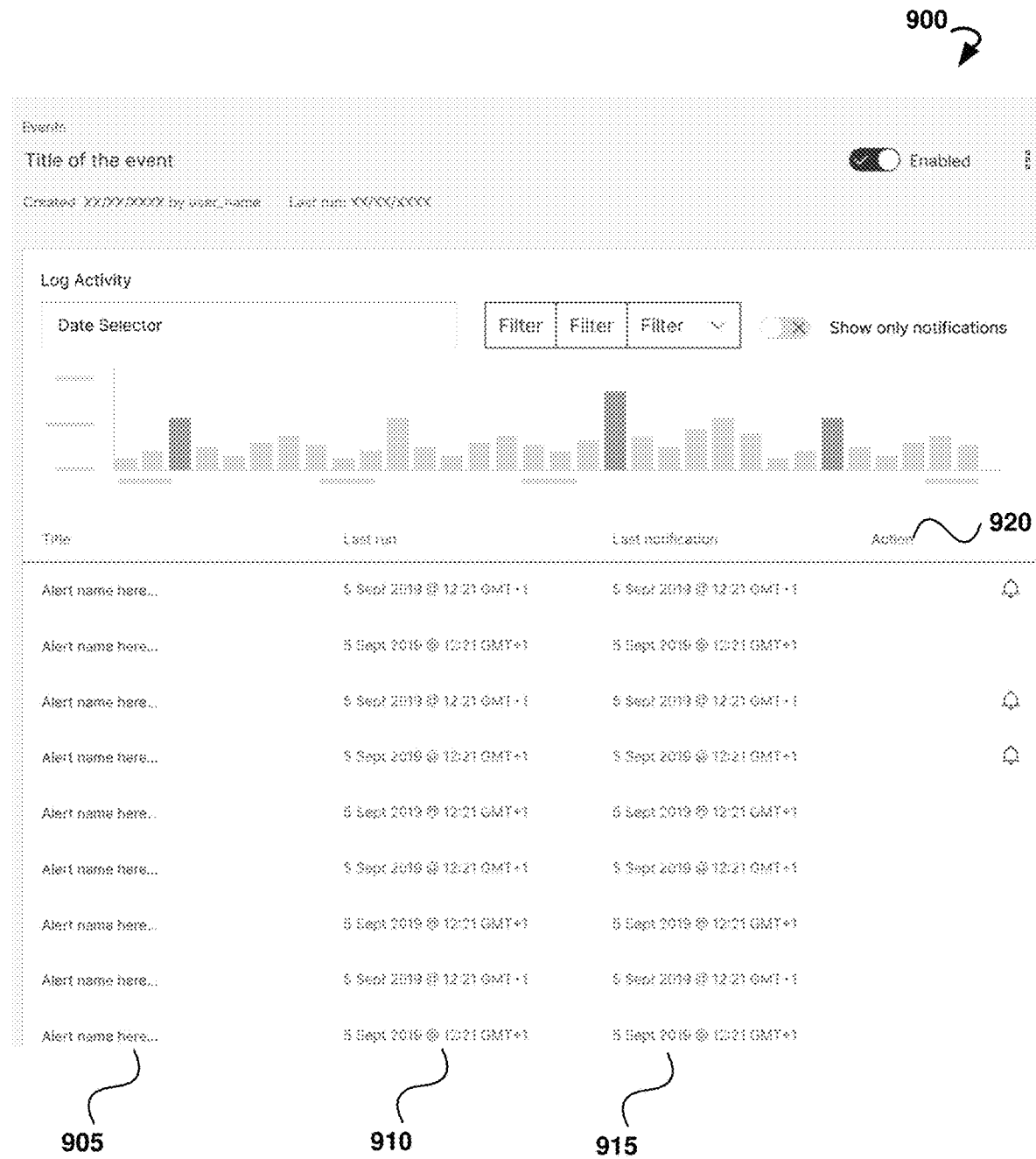
FIG. 9 shows a user interface illustrating an alert logged in a database, according to an example embodiment.

FIG. 9 shows a user interface 900 illustrating an alert logged into a database, according to an example embodiment. The user interface 900 shows a log activity 905 of the alert, time 910 when the alert was run, a notification 915 associated with the alert, and an action 920 initiated upon generation of the alert.

Figure 10:
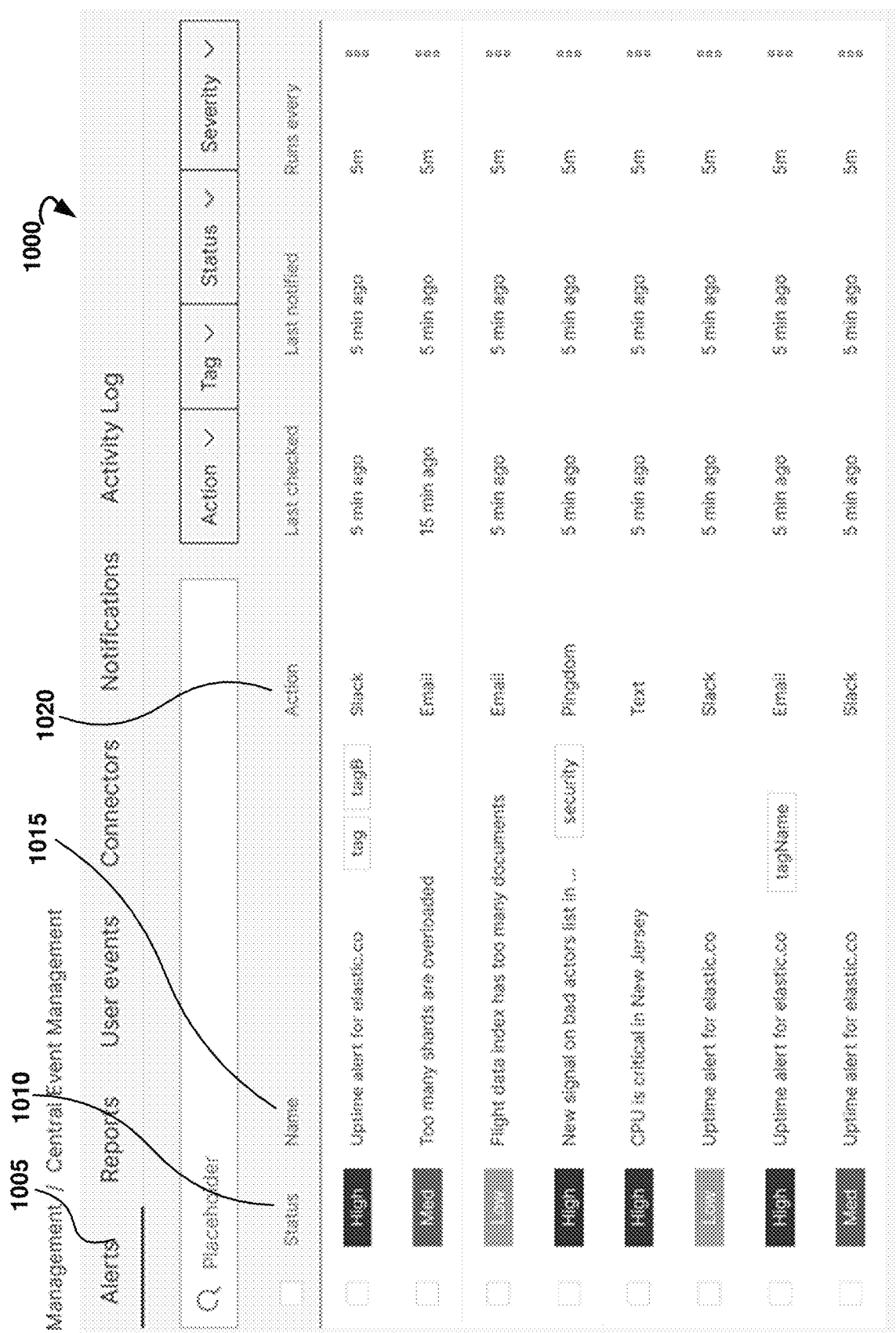
FIG. 10 shows a user interface illustrating an overview of alerts created by a user, according to an example embodiment.

FIG. 10 shows a user interface 1000 illustrating an overview 1005 of all alerts created in a computing environment, according to an example embodiment. The user interface 1000 may show at least a status 1010 of the alerts, a name 1015 of alerts, and a type of action 1020 initiated upon generation of alerts.

Figure 11:
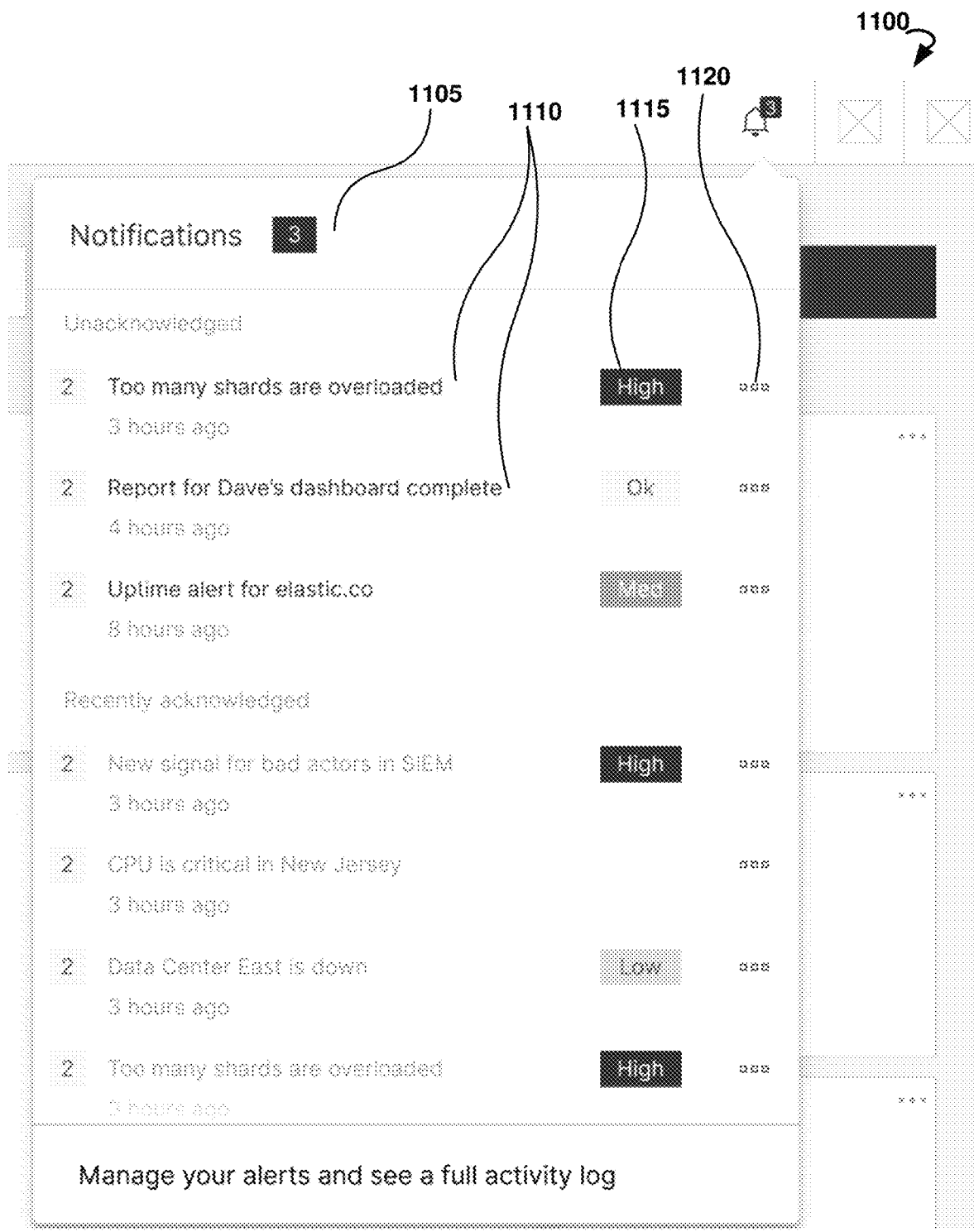
FIG. 11 shows a user interface illustrating a menu for managing notifications received by a user, according to an example embodiment.

FIG. 11 shows a user interface 1100 illustrating a menu 1105 for managing notifications received by a user in the course of execution of actions initiated upon generation of alerts, according to an example embodiment. The user may acknowledge notifications 1110, select an importance 1115 of the notifications 1110, and view details 1120 related to the notifications 1110.

Figure 12:
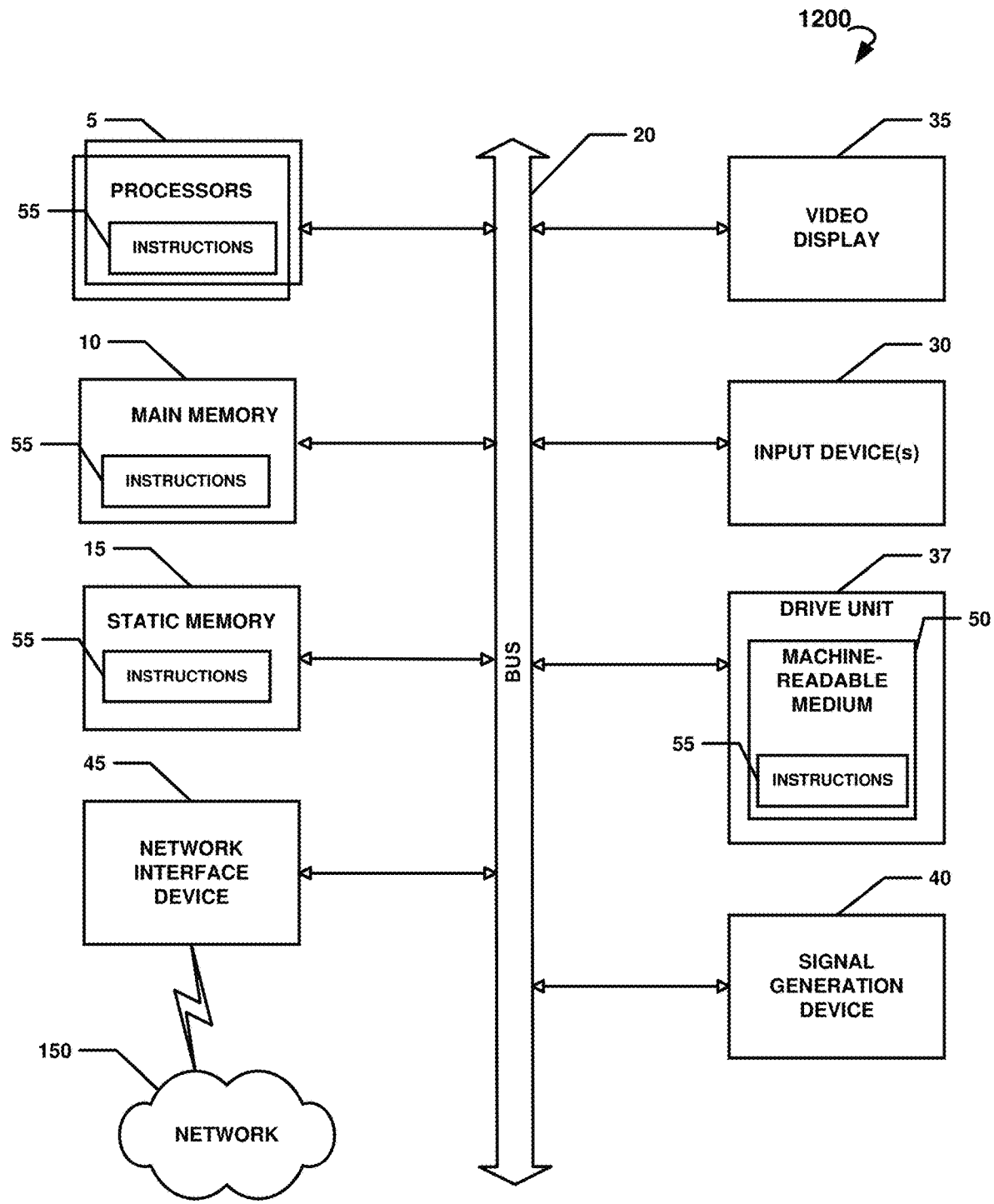
FIG. 12 is a schematic diagram of a computing system that is used to implement embodiments according to the present technology.

FIG. 12 is a diagrammatic representation of an example machine in the form of a computer system 1200, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processor or multiple processor(s) 5 (e.g., a CPU, a graphics processing unit (GPU), or both), and a main memory 10 and static memory 15, which communicate with each other via a bus 20. The computer system 1200 may further include a video display 35 (e.g., a liquid crystal display (LCD)). The computer system 1200 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1200 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1200. The main memory 10 and the processor(s) 5 may also constitute machine-readable media.

The instructions 55 may further be transmitted or received over a network (e.g., network 150, see FIG. 1) via the network interface device 45 utilizing any one of a number of well-known transfer protocols (e.g., HTTP). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an input/output device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for generating alerts in a computing environment, the method comprising:
    receiving parameters associated with an alert, the parameters including at least an alert condition and an action to be performed based on the alert condition;
    based on the parameters, monitoring at least a portion of network data from an input source according to a predetermined schedule, the predetermined schedule based on the alert condition and alerts generated by a machine learning technique analysis;
    based on the monitoring, detecting the alert condition in the at least the portion of the network data; and
    upon the detecting the alert condition, generating the alert.

2. The method of claim 1, wherein the parameters further include an object to be monitored, the object including one or more of the following: the portion of the network data, a network traffic, a network device, and a network state.

3. The method of claim 1, wherein the generating of the alert includes one of the following: creating a log entry in a database, providing a notification to a user, sending an email to the user, sending the alert to the user via a messenger, calling a webhook, generating a report, and scheduling a predetermined action.

4. The method of claim 1, wherein the alert condition includes one or more of the following: a performance threshold, a central processing unit usage, a network anomaly, a bandwidth usage, a memory usage, a predetermined network pattern, a geoboundary entry, a geoboundary exit, and logging data of one or more users.

5. The method of claim 1, wherein the parameters are received from a user.

6. The method of claim 5, wherein the parameters are received via one or more of the following: an alert user interface, an alert application programming interface (API), an alert library, and an alert base.

7. The method of claim 5, wherein the receiving the parameters includes at least one of the following: receiving a plugin code from the user and receiving an API extension plugin from the user.

8. The method of claim 1, further comprising:
    based on the alert, performing a predetermined action to eliminate the alert condition; and
    upon performing the predetermined action, continuing monitoring the at least the portion of the network data.

9. The method of claim 1, wherein the machine learning technique analysis being performed is based on historic data including at least one of detected alert conditions and generated alerts.

10. The method of claim 1, further comprising visualizing, for a user, via an alert user interface, a plurality of alerts, the plurality of alerts being generated based on the parameters provided by the user, the visualizing including:
    presenting one or more alert conditions which are currently monitored; and
    presenting one or more actions done in association with one or more of the plurality of alerts.

11. The method of claim 1, further comprising:
applying an optimistic concurrency control procedure to an output associated with the alert;
based on the optimistic concurrency control procedure, determining whether the output associated with the alert conflicts with at least one of outputs associated with a plurality of alerts; and
upon determining the conflict, discarding the output associated with the alert.

12. The method of claim 1, further comprising controlling a rate at which the alerts are generated according to the alert severity.

13. The method of claim 12 where the rate can be exceeded for short time periods.

14. The method of claim 1, wherein the machine learning technique analysis being performed is based on the monitoring the at least a portion of network data.

15. A system for generating alerts in a computing environment, the system comprising:
a processor; and
a memory communicatively coupled to the processor, the memory storing instructions executable by the processor to perform a method, the method comprising:
receiving parameters associated with an alert, the parameters including at least an alert condition and an action to be performed based on the alert condition;
based on the parameters, monitoring at least a portion of network data according to a predetermined schedule the predetermined schedule based on the alert condition and alerts generated by a machine learning technique analysis;
based on the monitoring, detecting the alert condition in the at least the portion of the network data from an input source; and
generating the alert upon the detecting the alert condition.

16. The system of claim 15, wherein the parameters further include an object to be monitored, the object including one or more of the following: the portion of the network data, a network traffic, a network device, and a network state.

17. The system of claim 15, wherein the generating of the alert includes one of the following: creating a log entry in a database, providing a notification to a user, sending an email to the user, sending the alert to the user via a messenger, calling a webhook, generating a report, and scheduling a predetermined action.

18. The system of claim 15, wherein the alert condition includes one or more of the following: a performance threshold, a central processing unit usage, a network anomaly, a bandwidth usage, a memory usage, a predetermined network pattern, a geoboundary entry, a geoboundary exit, and logging data of one or more users.

19. The system of claim 15, wherein the parameters are received from a user.

20. The system of claim 19, wherein the parameters are received via one or more of the following: an alert user interface, an alert application programming interface (API), an alert library, and an alert base.

21. The system of claim 19, wherein the receiving the parameters includes at least one of the following: receiving a plugin code from the user and receiving an API extension plugin from the user.

22. The system of claim 15, wherein the processor is further configured to:
based on the alert, perform a predetermined action to eliminate the alert condition; and
upon performing the predetermined action, continue monitoring the at least the portion of the network data.

23. A non-transitory processor-readable medium having instructions stored thereon, which when executed by one or more processors, cause the one or more processors to implement a method for generating alerts in a computing environment, the method comprising:
receiving parameters associated with an alert, the parameters including at least an alert condition and an action to be performed based on the alert condition;
based on the parameters, monitoring at least a portion of network data according to a predetermined schedule the predetermined schedule based on the alert condition and alerts generated by a machine learning technique analysis, wherein the machine learning technique analysis being performed is based on historic data including at least one of detected alert conditions and generated alerts; and
upon the detecting the alert condition, generating the alert.

* * * * *